Jan. 1, 1952  B. H. HADLEY  2,580,677
VEHICLE SWITCH FOR BACK-UP WARNING
Filed Oct. 13, 1945  2 SHEETS—SHEET 1
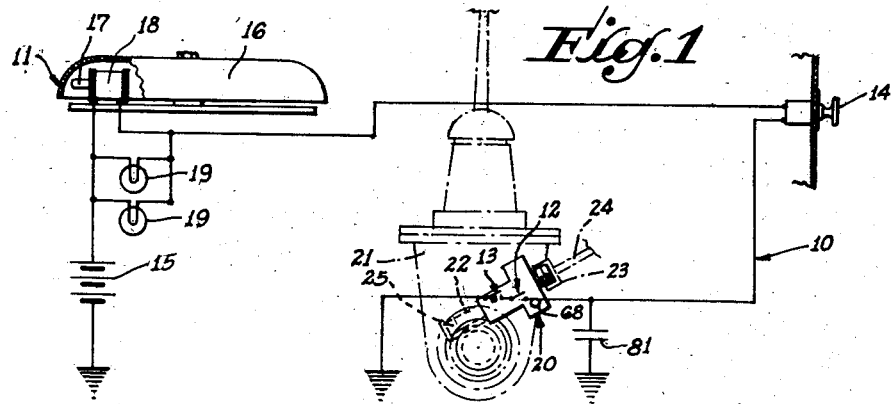
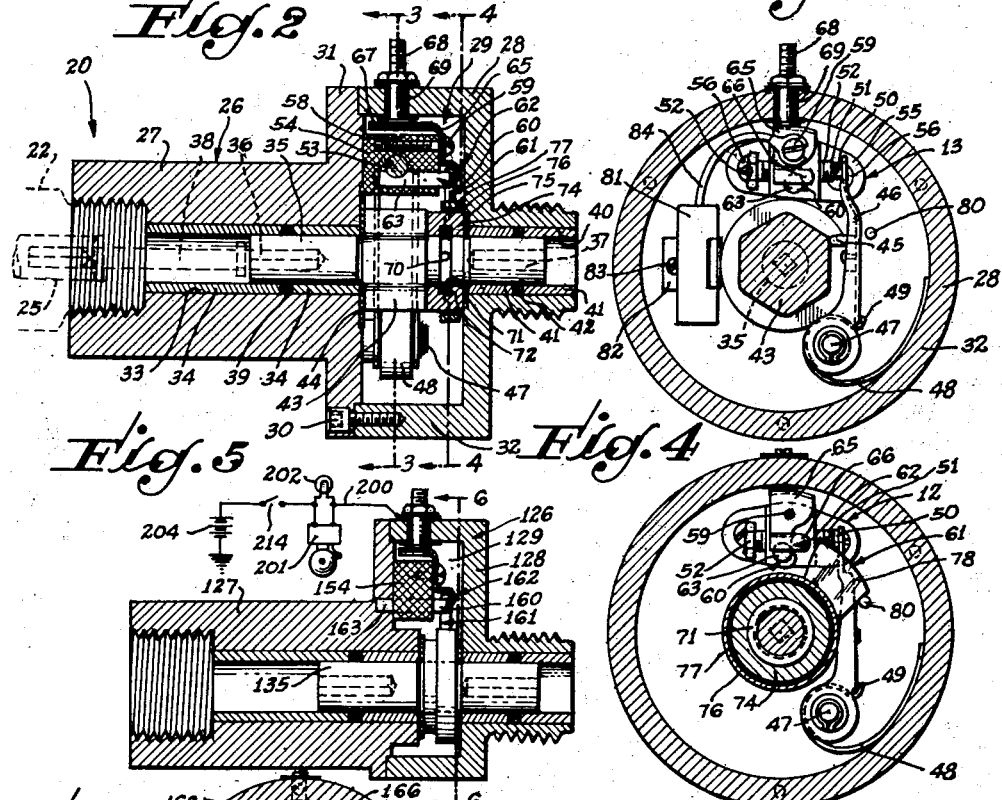
INVENTOR
BENJAMIN H. HADLEY
BY
HARRIS, KIECH, FOSTER & HARRIS
FOR THE FIRM
ATTORNEYS Jan. 1, 1952 B. H. HADLEY 2,580,677
VEHICLE SWITCH FOR BACK-UP WARNING
Filed Oct. 13, 1945 2 SHEETS—SHEET 2
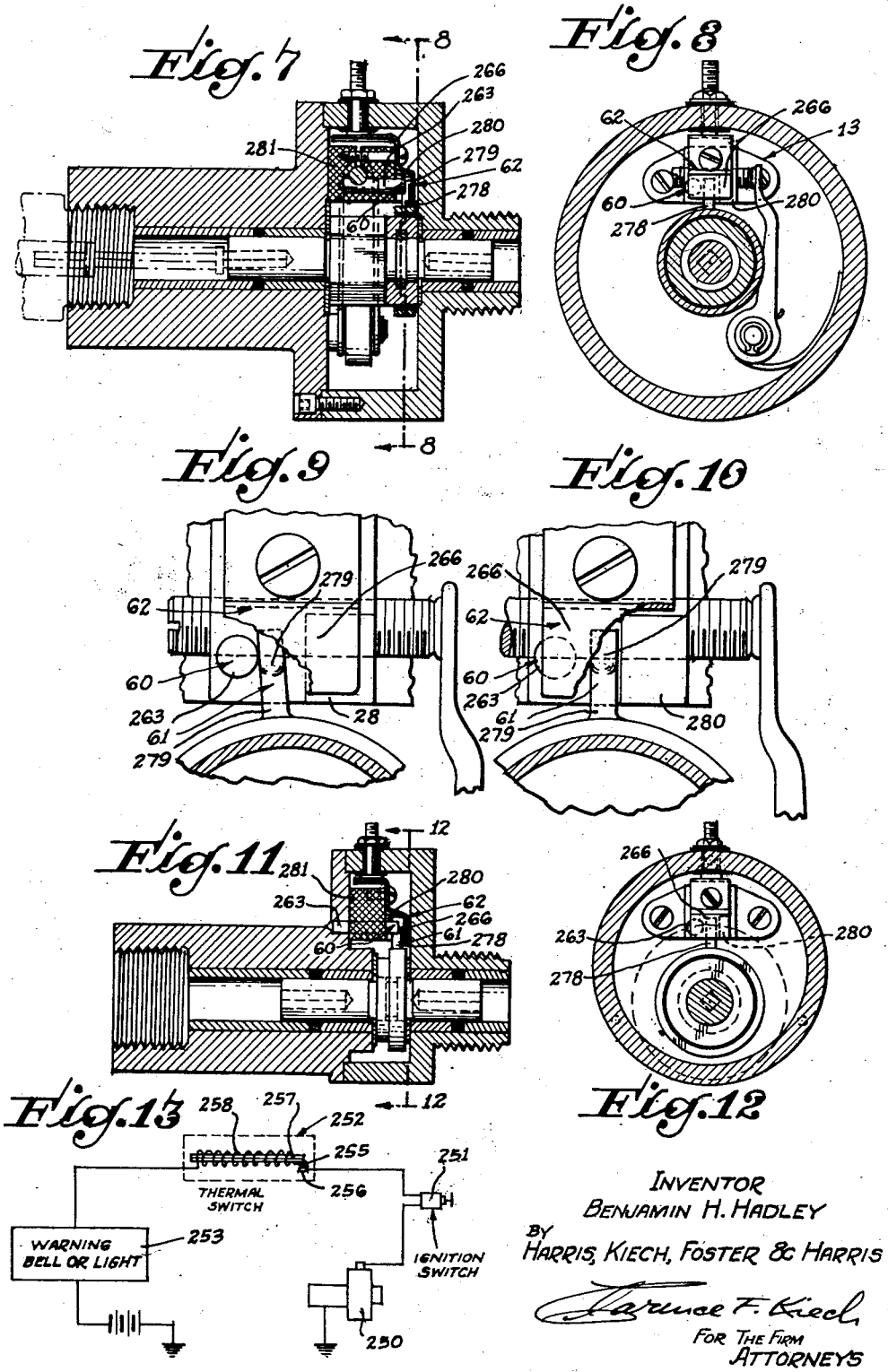
INVENTOR
BENJAMIN H. HADLEY
BY
HARRIS, KIECH, FOSTER & HARRIS
For The Firm
ATTORNEYS Patented Jan. 1, 1952

2,580,677

UNITED STATES PATENT OFFICE 2,580,677

VEHICLE SWITCH FOR BACK-UP WARNING

Benjamin H. Hadley, Pomona, Calif.

Application October 13, 1945, Serial No. 622,116

7 Claims. (Cl. 200—52)

My invention relates to electric switches and, more particularly, to automatic safety signals, either visible or audible, for warning persons of impending danger from rearwardly travelling vehicle.

As recognized by certain State statutes, the necessity of increasing personal safety by equipping automotive vehicles with automatic signals of this nature has become very important, particularly in the trucking industry, since the driver's rearward field of view is frequently limited or obstructed. Many personal injuries and extensive property damage have resulted from the absence, or improper functioning, of such warning devices for indicating rearward motion of a vehicle.

An object of this invention is to provide a simple, fool-proof, reliable warning system of this type.

Another object of this invention is to provide a novel attachment adapted for quick installation in conventional automotive vehicles.

A further object of my invention is to provide an automatic contact means for intermittently energizing an electric circuit; also, to connect such a contact means for periodically actuating a warning signal at a frequency which is proportional to the rearward velocity of a vehicle.

Still another object of my invention is to provide a warning circuit which is not energized unless both of two automatic switches are closed in series relationship. As applied to a vehicle warning system, the invention includes a primary control switch electrically responsive only to reversed rotation of a speedometer cable, and a secondary oscillatory switch intermittently responsive to any rotation of the speedometer cable, these switches cooperating to actuate a warning signal only during the actual rearward motion of the vehicle.

A further object of my invention lies in the provision of a novel automatic friction clutch for motivating a control switch.

Certain other objects of my invention are achieved by providing a self-contained adapter or coupling unit having the aforesaid control switch and/or the oscillatory switch installed therein, this coupling unit being readily connectable to the speedometer drive of a vehicle. Alternatively, however, this novel adapter or coupling unit may be regarded as a driven unit which may be readily adapted for connection with, or actuation by, any other driving member which rotates forwardly or rearwardly in response to forward or rearward motion of the automotive vehicle or in response to other means.

Additional objects and advantages of the invention will be evident to those skilled in the art from the following description of an exemplary embodiment.

Referring to the drawings:

Fig. 1 is a schematic diagram of an electrical circuit for utilizing the invention;

Fig. 2 is a longitudinal sectional view of the adapter showing the automatic electrical switches installed therein;

Fig. 3 is a transverse sectional view, taken along the line 3—3 of Fig. 2, showing the oscillatory or intermittent switch of the invention;

Fig. 4 is a transverse sectional view, taken along the line 4—4 of Fig. 2, showing the control switch of the invention;

Fig. 5 is a longitudinal sectional view of an alternative embodiment of the adapter;

Fig. 6 is a transverse sectional view, taken along the line 6—6 of Fig. 5;

Figs. 7 to 10 illustrate a modified embodiment, Figs. 7 and 8 being taken similarly to Figs. 2 and 4, while Figs. 9 and 10 are enlarged views of the modified contact assembly of the modified control switch, respectively in closed and open positions;

Figs. 11 and 12 show a modification in which the modified control switch is incorporated alone in the adapter, being taken similarly to Figs. 5 and 6; and Fig. 13 is a wiring diagram showing a connection for the embodiments of Figs. 5, 6, 11, and 12.

A general introduction to the invention may be obtained by referring to Fig. 1. In order to increase personal safety and prevent inadvertent destruction of property, an automotive vehicle should be equipped with an automatic electrical warning circuit 10, which intermittently actuates a signaling device 11 as long as the vehicle travels rearwardly. The frequency of the intermittent signal is desirably determined by the rate of rearward movement to indicate the degree of impending danger. As shown diagrammatically in Fig. 1, the invention accomplishes these purposes by use of a control switch 12 closed only during actual rearward movement of the vehicle and connected serially in the warning circuit 10 with an intermittent switch 13, which opens and closes upon motion of the vehicle in either a forward or reverse direction. The warning circuit 10 may be completed through a manual switch 14, desirably the ignition switch of the vehicle, and this circuit is energized by a suitable source of potential, such as a battery 15 of the vehicle.

Various signaling devices 11 may be employed for emitting visible or audible warnings, for example, an electromagnetically actuated gong having a metallic resonator or bell 16 struck by a hammer 17 to emit a single warning signal each time a solenoid 18 is electrically energized by the circuit 10. Such signaling devices may be installed in the vehicle in any appropriate manner or position. If visible signals 19, such as flashing colored lights, are desired, they may be electrically connected in parallel with the signaling device 11, or substituted therefor.

As best shown in Figs. 1, 2, 3, and 4, the control switch 12 and the intermittent switch 13 are housed in an adapter unit 20 interposed in the speedometer drive of the vehicle or connected to some element of the vehicle which turns in opposite directions upon actual forward and reverse movement of the vehicle. As illustrated, the vehicle includes a transmission 21 having a threaded speedometer drive connection 22 to which is normally connected a coupling 23 of a speedometer conduit 24 carrying the usual square-ended flexible speedometer drive member, the square end normally extending into a squared opening of a rotary member 25 driven by the transmission 21.

The adapter unit 20 includes a housing 26 comprising a cylindrical body member 27 and a head member 28 cooperating in defining a chamber 29. The members 27 and 28 are held together by countersunk screws 30 passing through a flange 31 of the body member 27 and threaded into an annular wall 32 of the head member 28. The body member 27 has an axial bore 33 providing a counterbore for engagement with the speedometer drive connection 22. Within the axial bore 33 are pressed two sleeves 34 which serve as bearings for a rotary shaft 35 whose ends have axially-disposed apertures 36, 37, preferably of square cross section, which allow the shaft 35 to be interposed in the speedometer drive of the vehicle. In this connection, the squared aperture 36 may receive one square end of a stub shaft 38, the other square end of this stub shaft fitting into the aforesaid squared opening of the rotary member 25. The two sleeves 34 are spaced from each other to provide an annular space containing an annular sealing ring 39, preferably of doughnut shape and formed of rubber.

Similarly, the head member 28 provides a bore 40 axially aligned with the bore 33 and in which are pressed sleeves 41 spaced to form an annular space providing a sealing ring 42 similar to the ring 39. These sealing rings resiliently engage the periphery of the shaft 35 to form effective grease seals for sealing within the chamber 29 any lubricant therein and for preventing entry into this chamber of any lubricant from the transmission 21 or from the speedometer conduit 24. The head member 28 is externally threaded to receive the coupling 23. The square end of the flexible speedometer drive member positioned within the speedometer conduit 24 extends into the aperture 37 of the shaft 35.

The intermittent switch 13 is within the chamber 29 of the housing 26. Referring to Figs. 2 and 3 where the details of this intermittent switch are best shown, the shaft 35 carries a cam 43 separated from the flange 31 by a washer 44. The cam surface of the cam 43 is shown as hexagonal and is engaged by a follower 45 of a contact arm 46 pivoted on a pin 47 carried by the flange 31. The follower 45 is resiliently urged into contact with the cam 43 by a resilient member 48, exemplified as a band of spring steel with one end looping around the journalled end of the contact arm 46 and providing a hook 49 engaging same, the other end being flexed inwardly during assembly of the body member 27 and the head member 28 to bear against the inner surface of the annular wall 32 of the head member.

The intermittent switch 13 includes a pair of make-and-break contacts, shown as including a movable contact 50 carried by the end of the contact arm 46 and an adjustable stationary contact 51 provided by the end of an adjusting screw 52. As best shown in Figs. 2 and 3, this adjusting screw extends through a threaded bore 53 of a post 54 formed of insulating material, this post providing ears 55 secured to the flange 31, as by screws 56. The threaded bore 53 extends parallel to the flange 31 and a saw-cut 58 extends from the outer surface of the post to this threaded bore. This saw-cut is traversed by a screw 59 to contract the material of the post 54 against the adjusting screw 52 in clamping relationship. By loosening the screw 59, the adjusting screw 52 can be adjusted for any desired maximum clearance between the contacts 50 and 51, this adjustment varying the interval of time which elapses while these contacts are engaged. The preferred setting is such that the periods of engagement of these contacts are of shorter duration than the periods of disengagement and so that the follower 45 engages only the crests of the cam 43.

The control switch 12 is connected is series with the intermittent switch 13 and includes, in general, a stationary control contact 60, a movable control contact 61, and an auxiliary control contact 62. The function of the control switch 12 is to render the intermittent switch 13 operative to energize the signaling device 11 only during rearward movement of the vehicle. For this purpose, the control switch is actuated by a friction drive, to be later described in detail.

The construction of the control switch 12 is best shown in Figs. 2, 3, and 4. Referring thereto, the stationary control contact 60 is formed by the end of a pin 63 pressed into a bore extending perpendicular to the flange 31, as best shown in Fig. 2. This bore intersects the threaded bore 53 to permit the pin 63 to be electrically connected to the adjusting screw 52 to place the control switch 12 and the intermittent switch 13 in series relationship. Preferably, the pin 63 is positioned in its bore before the bore 53 is drilled and threaded, wherefore a portion of the threads of the bore 53 is cut in the pin 63, thus insuring good electrical contact between the adjusting screw 52 and the pin 63.

The auxiliary control contact 62 is a part of a strap 65 formed of spring material and held in place by the screw 59. It provides a resilient offset portion terminating in a resilient brush contact or tab 66 permanently spaced from the stationary control contact 60 but adapted to be engaged by the movable control contact 61 in its movement toward the stationary control contact 60, as will be later described in detail. The movable control contact 61 bridges between the auxiliary control contact 62 and the stationary control contact 60 to complete the circuit to the signaling device 11.

It will be readily apparent that the auxiliary control contact 62 should be insulated from the housing 26, yet connectable to the warning circuit 10. This is accomplished by bending the strap 65 to provide a resilient contact 67 frictionally engaging the head of a bolt 68 extending through the annular wall 42 and insulated therefrom by a sleeve-like structure 69. This arrangement permits removal of the head member 28 from the body member 27 without disturbing the electrical connections made to the bolt 68 which, as suggested in Fig. 1, is connected in the warning circuit 10. Thus, when the head member 28 is moved from the body member 27, the head of the bolt 68 slides along the resilient contact 67. In reassembling the members 27, 28, it is only necessary to orient the member 28 angularly with respect to the member 27 so that the head of the bolt 68 engages the resilient contact 67. The countersunk screws 30 maintain this angular orientation.

The friction drive means for the control switch 12 is best shown in Figs. 2 and 4. Referring thereto, the shaft 35 provides a shallow peripheral groove adapted to receive a doughnut-shaped ring 71, preferably formed of resilient material. A peripherally-continuous rubber ring is preferred, this ring having such an internal diameter as to move along the periphery of the shaft 35 and drop into the shallow groove 70 to be in frictional engagement with the bottom of this groove. The ring 71 is carried in an annular groove 72 of a collar 74 of an internal diameter to be freely rotatable relative to the shaft 35. A washer 75 separates the collar 74 from the head member 28. The collar 74 is peripherally surrounded by a ring of insulating material 76 and a ring 77, the latter carrying the movable control contact 61. The insulating ring 76 is compressed between the ring 77 and the collar 74 to insulate the movable control contact 61 from the collar, while insuring that this movable control contact 61 shall move rigidly with the collar.

As best shown in Fig. 4, the movable control contact 61 is in the form of a blade 78 rotatable about the axis of the shaft 35 between limiting positions. When the vehicle is moving in a forward direction, the shaft 35 moves clockwise, as viewed in Fig. 4, and the friction drive means moves the blade 78 into contact with a stop means, shown as comprising a pin 80 carried by the flange 31. This pin 80 is either formed of insulating material or is suitably insulated from the body member 27. When the vehicle moves rearwardly, the shaft 35 turns counter-clockwise, as viewed in Fig. 4, and the blade 78 and its movable control contact 61 first engage, and are energized by, the resilient tab 66 of the auxiliary control contact 62, after which a further and very small counter-clockwise movement brings this movable control contact into circuit-closing engagement with the stationary control contact 60. Thus, during this last portion of its movement, the movable control contact 61 bridges between the auxiliary control contact 62 and the stationary control contact 60 to connect the intermittent switch 13 serially in the warning circuit 10. The total angular movement of the movable control contact 61 between its limiting positions is small so that the control switch 12 closes before the vehicle is moved backward any substantial distance. Continued rearward movement of the vehicle will cause energization of the warning circuit 10 under the action of the intermittent switch 13 at a frequency proportional to the rearward velocity of the vehicle.

To reduce arcing between the contacts of the intermittent switch and the contacts 61, 62 of the control switch, and also to store electrical energy for the bell 16 thus aiding in the percussive blows of the hammer 17, I prefer to connect a condenser 81 around the two pairs of contacts. As suggested in Figs. 1 and 3, one terminal of this condenser is grounded to the frame of the vehicle through a clip 82 and a screw 83 securing the condenser to the flange 31 of the body member 27. The other terminal of the condenser 81 is connected by a lead 84 to the strap 65, this lead carrying the terminal extending beneath the head of the screw 59.

The friction drive means for the control switch 12 comprises any means for moving the movable control contact 61 between its limiting positions upon forward and reverse movement of the vehicle, respectively. The embodiment of the friction drive means shown in Fig. 2 is particularly valuable in this connection. The arrangement permits the collar 74 and its associated ring 77 to be slipped longitudinally over the end of the shaft 35 when the head member 28 is removed. When the ring 71 drops into the shallow groove 70 it resiliently holds the collar 74 in the correct axial position. In the preferred arrangement, the ring 71 fits rather snugly in the annular groove so that the sliding takes place between the ring 71 and the bottom of the groove 70 of the shaft. However, if desired, the annular groove 72 may be made slightly larger so that the sliding takes place between the ring 71 and the walls of this annular groove 72, the ring then rotating with the shaft 35. Alternatively, sliding can be made to take place at both positions. There is very little wear on the ring 71, particularly if it is formed of synthetic rubber and its periphery is properly lubricated, as by filling the unoccupied portion of the groove 72 with a light oil.

The control switch 12 of the invention can be employed independently of the intermittent switch 13, as suggested in Figs. 5 and 6. Here, a housing 126 is formed by a body member 127 and a head member 128, these members cooperating in providing a chamber 129 through which a shaft 135 extends. A post 154 formed of insulating material is mounted in the chamber 129. As before, this form of the invention includes a stationary control contact 160, a movable control contact 161, and an auxiliary control contact 162. The stationary control contact 160 is formed by the end of a pin 163 which, in this instance extends through the post 154 to be grounded to the frame of the vehicle through the body member 127.

The auxiliary control contact 162 is constructed as previously mentioned and includes a resilient tab 166 engageable by the movable control contact 161 before it engages the stationary control contact 160. The friction drive for the movable control contact 161 is as previously described, and includes a collar 174 frictionally coupled with the shaft 135 and carrying a ring of insulating material 176 surrounded by a ring 177 which carries the movable control contact 161. A pin 180 limits the degree of clockwise movement of the movable control contact 161, as viewed in Fig. 6.

This embodiment of the invention is well adapted to the warning circuit shown in Fig. 5 wherein a conductor 200 is connected to the auxiliary control contact 162 and extends to a bell 201 and a signal light 202 connected in parallel, the warning circuit being energized by a battery 204 and including a control switch 214 which may be the ignition switch of the vehicle. In this instance, the bell 201 is desirably of the type which gives out intermittent signals so long as it is energized, e. g., it may be of the doorbell type having conventional make-and-break contacts associated therewith to give a continuous warning signal during each period of energization. When the vehicle moves in a forward direction, the movable control contact 161 is thrown against the pin 180 and no warning is given. However, even a small rearward movement of the vehicle will bridge the movable control contact 161 between the auxiliary control contact 162 and the stationary control contact 160 to complete the warning circuit, this circuit remaining energized so long as the rearward movement of the vehicle continues.

The embodiment of Figs. 7 to 10 is essentially similar to that of Figs. 2 to 4, with the exception of the use of a modified control switch construction which requires only a few inches of rearward vehicle movement for actuation. The housing arrangement, the intermittent switch 13, and the friction drive therefor are as previously described. However, the stationary control contact 60, the movable control contact 61, and the auxiliary control contact 62 of the control switch 12 are differently arranged, as follows. Here, the stationary control contact comprises a pin 263, as before, and the auxiliary control contact forms a tab 266 of modified shape. Also, the movable control contact comprises a narrow arm or blade 278 driven by the friction drive means, and provides a projection 279 which remains in sliding engagement with the tab 266. The pin 80 is replaced by a stop member 280 formed on a modified post, indicated at 281, and formed of insulating material, as before. The distance between the pin 263 and the stop member 280 is only slightly larger than the arm or blade 278 so that only a small amount of rearward vehicle movement is required to move it from its Fig. 10 position, assumed during forward motion of the vehicle and retained during the time the vehicle is stopped, to its Fig. 9 position, assumed during rearward motion of the vehicle. In the latter position, the arm or blade 278 electrically connects the auxiliary control contact 62 with the pin 263 of the stationary control contact 60 to connect the intermittent switch in circuit.

Figs. 11 and 12 show the same modified control switch alone in the housing and the main elements are identical with the embodiment of Figs. 7 to 10 except that the intermittent switch 13 is omitted and, as in Fig. 5, the pin 263 is directly grounded to the housing. This embodiment can be connected in circuit with a make-and-break type bell or a back-up light illuminating the rearward path of the vehicle, or both.

Another circuit, designed to give a flashing signal whether visual or audible is suggested in Fig. 13, in which the embodiment of the invention shown in Figs. 11 and 12 is indicated at 250 as connected serially with a manual control or ignition switch 251, a thermal switch 252, and a warning device 253. The thermal switch is of the make-and-break type with normally-closed contacts 255 and 256 disengaged by bending of a bimetallic strip 257 heated by a heater winding 258 serially connected in the circuit through contacts 255 and 256. In this instance, the frequency of the signal will be determined by the rate of heating and cooling of the bimetallic strip 258.

Various changes and modifications can be made without departing from the spirit of the invention as defined in the appended claims.

I claim as my invention:

1. In a back-up warning switch adapted for connection to a speedometer drive connection of a vehicle, said drive connection providing a rotary member rotatable in forward and reverse directions upon forward and reverse movement of said vehicle, and adapted to energize a circuit during movement only in such reverse direction, said switch including in combination: a housing attachable to said speedometer drive connection and providing a chamber extending around an axis; a shaft journalled in said housing to turn about said axis and extending into said chamber, said shaft being adapted for connection to said rotary member to turn therewith in forward and reverse directions; a stationary control contact in said chamber; a movable control contact in said chamber extending outwardly from said shaft; an electrically insulated stop means in said chamber, said movable control contact being disposed to move between said stationary control contact and said stop means, the distance between said stationary control contact and said stop means being only slightly greater than the width of said movable control contact; and friction drive means for connecting said shaft to said movable control contact to move same into engagement with said stationary control contact during reverse movement of said shaft and to move same into engagement with said stop means upon forward movement of said shaft, said friction drive means including a collar surrounding said shaft and a resilient member of rubber-like material clamped between and resiliently engaging said collar and said shaft.

2. In a back-up warning switch adapted for connection to a speedometer drive connection of a vehicle, said drive connection providing a rotary member rotatable in forward and reverse directions upon forward and reverse movement of said vehicle, and adapted to energize a circuit during movement only in such reverse direction, said switch including in combination: a housing attachable to said speedometer drive connection and providing a chamber extending around an axis; a shaft journalled in said housing to turn about said axis and extending into said chamber; said shaft being adapted for connection to said rotary member to turn therewith in forward and reverse directions; a stationary control contact in said chamber; a movable control contact in said chamber extending outwardly from said shaft; an electrically insulated stop means in said chamber, said movable control contact being disposed to move between said stationary control contact and said stop means, the distance between said stationary control contact and said stop means being only slightly greater than the width of said movable control contact; and friction drive means for connecting said shaft to said movable control contact to move same into engagement with said stationary control contact during reverse movement of said shaft and to move same into engagement with said stop means upon forward movement of said shaft, said shaft providing a shallow peripheral groove, said friction drive means including a collar surrounding said shaft and including a ring of resilient, rubber-like material in said shallow groove and clamped between said collar and said shaft to form a friction drive for said collar.

3. In a back-up warning switch adapted for connection to a speedometer drive connection of a vehicle, said drive connection providing a rotary member rotatable in forward and reverse directions upon forward and reverse movement of said vehicle, and adapted to energize a circuit during movement only in such reverse direction, said switch including in combination: a housing attachable to said speedometer drive connection and providing a chamber; a shaft journalled in said housing and extending into said chamber, said shaft being adapted for connection to said rotary member to turn therewith in forward and reverse directions; a stationary control contact in said chamber, said stationary control contact being adapted to be electrically connected to said housing; an auxiliary control contact in said chamber, said auxiliary control contact and said stationary control contact being connectible in said circuit, said auxiliary control contact being insulated from said housing; a stop means in said chamber; a movable control contact in said chamber; and a friction drive means operatively associated with said shaft and said movable control contact to move said movable control contact against said stop means upon forward rotation of said shaft and to move same in bridging relationship between said auxiliary control contact and said stationary control contact upon reverse rotation of said shaft, said friction drive means including a collar surrounding said shaft, a ring of resilient material frictionally engaging said collar and said shaft, and insulating means for mounting said movable control contact to move with said collar while electrically insulated therefrom.

4. In a back-up warning switch adapted for connection to a speedometer drive connection of a vehicle, said drive connection providing a rotary member rotatable in forward and reverse directions upon forward and reverse movement of said vehicle, and adapted to energize a circuit intermittently during movement only in such reverse direction, said switch including in combination: a housing attachable to said speedometer drive connection and providing a chamber; a shaft journalled in said housing and extending into said chamber, said shaft being adapted for connection to said rotary member to turn therewith in forward and reverse directions; an intermittent switch in said chamber and comprising a stationary contact, a movable contact, a contact arm carrying said movable contact, and a cam carried by said shaft for moving said contact arm to engage said movable and stationary contacts intermittently during rotation of said shaft in said forward and reverse directions; a control switch in said chamber, said control switch including a stationary control contact, a movable control contact, and a stop means, said movable control contact being disposed to move between said stationary control contact and said stop means; friction drive means for connecting said shaft to said movable control contact to move same into engagement with said stationary control contact during reverse movement of said shaft and to move same into engagement with said stop means upon forward movement of said shaft, said friction drive means including a collar in said chamber surrounding said shaft adjacent said cam, and a resilient member between and resiliently engaging said collar and said shaft; and means for serially connecting said contacts of said intermittent switch and said control contacts of said control switch.

5. In a back-up warning switch adapted for connection to a speedometer drive connection of a vehicle, said drive connection providing a rotary member rotatable in forward and reverse directions upon forward and reverse movement of said vehicle, and adapted to energize a circuit intermittently during movement only in such reverse direction, said switch including in combination: a housing attachable to said speedometer drive connection and providing a chamber; a shaft journalled in said housing and extending into said chamber, said shaft being adapted for connection to said rotary member to turn therewith in forward and reverse directions; an intermittent switch in said chamber and comprising a stationary contact, a movable contact, a contact arm carrying said movable contact, and a cam carried by said shaft for moving said contact arm to engage said movable and stationary contacts intermittently during rotation of said shaft in said forward and reverse directions; a control switch in said chamber, said control switch including a stationary control contact, a movable control contact, and a stop means, said movable control contact being disposed to move between said stationary control contact and said stop means; friction drive means for connecting said shaft to said movable control contact to move same into engagement with said stationary control contact during reverse movement of said shaft and to move same into engagement with said stop means upon forward movement of said shaft, said shaft providing a shallow peripheral groove and said friction drive means including a collar surrounding said shaft and a ring of resilient material in said shallow groove and engaging said collar to form a friction drive for said collar; and means for serially connecting said contacts of said intermittent switch and said control contact of said control switch.

6. In a back-up warning switch adapted for connection to a speedometer drive connection of a vehicle, said drive connection providing a rotary member rotatable in forward and reverse directions upon forward and reverse movement of said vehicle, and adapted to energize a circuit intermittently during movement only in such reverse direction, said switch including in combination: a housing attachable to said speedometer drive connection and providing a chamber; a shaft journalled in said housing and extending into said chamber, said shaft being adapted for connection to said rotary member to turn therewith in forward and reverse directions; an intermittent switch in said chamber and comprising a stationary contact, a movable contact, a contact arm carrying said movable contact, and a cam carried by said shaft for moving said contact arm to engage said movable and stationary contacts intermittently during rotation of said shaft in said forward and reverse directions; a control switch in said chamber, said control switch including a stationary control contact, a movable control contact, and a stop means, said movable control contact being disposed to move between said stationary control contact and said stop means, said control switch including an auxiliary control contact engageable with said movable control contact before the latter engages said stationary control contact whereby said movable control contact bridges between and electrically connects said auxiliary control contact and said stationary control contact; friction drive means for connecting said shaft to said movable control contact to move same into engagement with said stationary control contact during reverse movement of said shaft and to move same into engagement with said stop means upon forward movement of said shaft; and means for serially connecting said contacts of said intermittent switch and said control contacts of said control switch.

7. A one-way switch adapted for connection to a rotary member rotatable in both forward and reverse directions and adapted to energize a circuit during movement of said rotary member only in such reverse direction, said switch including in combination: a shaft including means for connecting same to said rotary member to turn therewith in forward and reverse directions; a housing providing a chamber disposed around said shaft, said housing providing bearing means for journalling said shaft; a movable control contact blade; a friction drive means for connecting said movable blade to said shaft to move said blade in said chamber in an arcuate path in forward and reverse directions upon forward and reverse movements of said shaft; a stationary control contact projecting into the path of arcuate movement of said movable blade to act as a stop for said blade during reverse motion thereof and to contact same electrically, thus limiting the reverse motion of said blade while permitting continued reverse motion of said shaft through slippage of said friction drive means; a stop member projecting into the path of arcuate movement of said movable blade to limit the forward motion thereof while permitting continued forward motion of said shaft through slippage of said friction drive means, said stop member being displaced from said stationary control contact an arcuate distance only slightly greater than the arcuate width of said blade and acting to stop any forward motion of said blade shortly after electrical disengagement of said blade and said stationary control contact; means for electrically insulating said movable blade from said shaft and from said housing; and a brush contact extending into said arcuate path of said blade to engage and energize said blade before it contacts said stationary control contact upon reverse movement of said blade.

BENJAMIN H. HADLEY.

REFERENCES CITED

The following references are of record in the file of this patent:

UNITED STATES PATENTS

| Number | Name | Date |
|---|---|---|
| 564,168 | Tower | July 14, 1896 |
| 874,289 | Bemus | Dec. 17, 1907 |
| 915,891 | Schaake et al. | Mar. 23, 1909 |
| 1,273,378 | Kennington | July 28, 1918 |
| 1,394,032 | McKeown | Oct. 18, 1921 |
| 1,482,167 | Varley | Jan. 29, 1924 |
| 1,703,319 | Patterson et al. | Feb. 29, 1929 |
| 2,132,188 | Rockett et al. | Oct. 4, 1938 |
| 2,139,482 | Atz, Jr. | Dec. 6, 1938 |
| 2,143,447 | Moeller | Jan. 10, 1939 |

FOREIGN PATENTS

| Number | Country | Date |
|---|---|---|
| 523,983 | Germany | Apr. 30, 1931 |